US007079558B2

United States Patent
Xu et al.

(10) Patent No.: US 7,079,558 B2
(45) Date of Patent: Jul. 18, 2006

(54) MODE-LOCKED LASER METHOD AND APPARATUS

(75) Inventors: Faming Xu, Centereach, NY (US); Qiang Fu, Dix Hills, NY (US); Brian Rogers, Centereach, NY (US); Zhengyu Chen, Coram, NY (US); Wentao Hu, Centereach, NY (US)

(73) Assignee: Excel/Quantronix, Inc., East Setauket, NY (US)

( * ) Notice: Subject to any disclaimer, the term of this patent is extended or adjusted under 35 U.S.C. 154(b) by 0 days.

(21) Appl. No.: 10/999,711

(22) Filed: Nov. 30, 2004

(65) Prior Publication Data

US 2005/0117614 A1 Jun. 2, 2005

Related U.S. Application Data

(60) Provisional application No. 60/526,224, filed on Dec. 1, 2003.

(51) Int. Cl.
*H01S 3/98* (2006.01)
*H01S 3/13* (2006.01)
*H01S 3/00* (2006.01)

(52) U.S. Cl. .............. 372/38.08; 372/18; 372/19; 372/29.02

(58) Field of Classification Search .............. 372/38.08
See application file for complete search history.

(56) References Cited

U.S. PATENT DOCUMENTS

| 3,534,289 A | * | 10/1970 | Clark et al. ............ 372/26 |
| 4,025,875 A | | 5/1977 | Fletcher et al. |
| 2002/0006141 A1 | * | 1/2002 | Ogura ............ 372/18 |

* cited by examiner

*Primary Examiner*—Armando Rodriguez
(74) *Attorney, Agent, or Firm*—Darby & Darby PC; Bruce E. Black

(57) ABSTRACT

A method and apparatus for stabilizing the output of a mode-locked laser by monitoring the temporal behavior of the pulse train profile and controlling the laser cavity optical length and/or loss modulation frequency accordingly. A mismatch of the cavity optical length and the loss modulation frequency will yield a first characteristic noise condition on the laser beam pulse train when the optical length is too short for a given loss modulation frequency and a second, different noise condition when the optical length is too long. The laser beam is monitored and analyzed to determine which noise condition is present. The cavity optical length is adjusted accordingly by movement of one or more optical elements or by changing the index of refraction of one or more optical elements. In the alternative, or additionally, the loss modulation frequency can be adjusted to bring the laser back into mode lock.

20 Claims, 6 Drawing Sheets

MODE-LOCKED LASER METHOD AND APPARATUS

RELATED APPLICATIONS

The present application claims priority from U.S. Provisional Patent Application No. 60/526,224, filed on Dec. 1, 2003, and which is herein incorporated by reference in its entirety.

FIELD OF THE INVENTION

The present invention relates to mode-locked lasers, particularly to methods and apparatus for achieving mode-lock with high stability.

BACKGROUND INFORMATION

High stability mode-locked lasers are of importance for research and industrial applications, among others. In order for such a laser to be mode-locked, the cavity length of the laser must be matched to the frequency of the loss modulator (e.g., an acousto-optic modulator) of the laser. The loss modulation frequency of the laser corresponds to the pulse repetition frequency. This matched condition can be expressed as follows:

$$f=c/(2*L), \qquad (\text{Eq. 1})$$

where f is the loss modulation frequency of the mode-lock pulse train, c is the speed of light, and L is the optical path length of the laser cavity. Usually, thermal effects on the laser components and optical base are the primary cause of laser cavity length variations. In such case, the mode-lock laser can become unstable. Either the optical path length of the laser cavity or the frequency of the loss modulator has to be adjusted to keep them matched in accordance with Eq. 1.

Several methods of stabilizing mode-lock lasers are known. A first approach utilizes a simple feedback loop, which detects the mode-locked pulses and then uses the amplified detector output to drive the laser mode-locker. A second known method utilizes a phase-lock loop, which compares the detected output of the laser to the signal applied to the mode-locker, with the resultant error signal being used to correct the drive of the mode-locker.

Both of the aforementioned methods have similar disadvantages, however, as neither can easily be used with a loss modulator mode-locking element since time varying losses inside the cavity introduce relaxation oscillation noise on the laser output which, in turn, produces noise in the feedback loops. When a loss modulator is driven hard enough to produce short mode-locked pulses, such noise can increase to a level that causes these feedback systems to lose lock. Both known methods also allow the transmitter frequency to vary continuously. (See U.S. Pat. No. 4,025,875).

In a third known mode-locked laser stabilization method, a portion of the fundamental optical radiation is used to generate second harmonic radiation for the purpose of detection. The amount of the power of the second harmonic frequency depends on the match between the optical length of the laser cavity and the mode-lock frequency. In this method, a significant portion of the power of the mode-locked laser is used just for detection. In addition, an expensive nonlinear crystal is needed, and a dither frequency is present on the laser output, which may be undesirable for some applications.

SUMMARY OF THE INVENTION

In an exemplary embodiment, the present invention provides an apparatus and method for maintaining a mode-locked laser in a mode-locked condition by adjusting the optical length of the laser cavity in accordance with the temporal behavior of the pulse train profile. More specifically, it has been observed that when a laser is out of mode-lock, the pulse train will exhibit a significant level of noise which is not present when it is in a mode-locked condition. Furthermore, a first characteristic noise will be observed if the optical length of the laser cavity is longer than the optimal length for mode-lock (at a desired pulse repetition frequency), whereas a second characteristic noise will be observed if the optical length of the laser cavity is shorter than the optimal length for mode-lock. A circuit and method in accordance with the present invention monitor the pulse train generated by the laser and determine, based on the noise detected, whether the laser is in a mode-locked condition, whether the optical length of the laser cavity is too long for mode lock, or whether the optical length of the laser cavity is too short for mode lock. If need be, the circuit and method of the present invention will then adjust the optical length of the laser cavity accordingly to bring or maintain the laser in a mode-locked condition.

In a further aspect of the present invention, the ambient temperature of the laser is sensed to provide an initial estimate for the optical length adjustment needed to establish mode lock. Once the initial adjustment is made, a more precise adjustment is made in accordance with the above-described method until mode lock is actually achieved.

In yet a further aspect of the present invention, the actual adjustment made and the ambient temperature are noted to provide a more precise estimate of the initial adjustment to be used in the future.

These and other aspects of the present invention will be apparent from the following detailed description and drawings.

DETAILED DESCRIPTION

Figure 1:
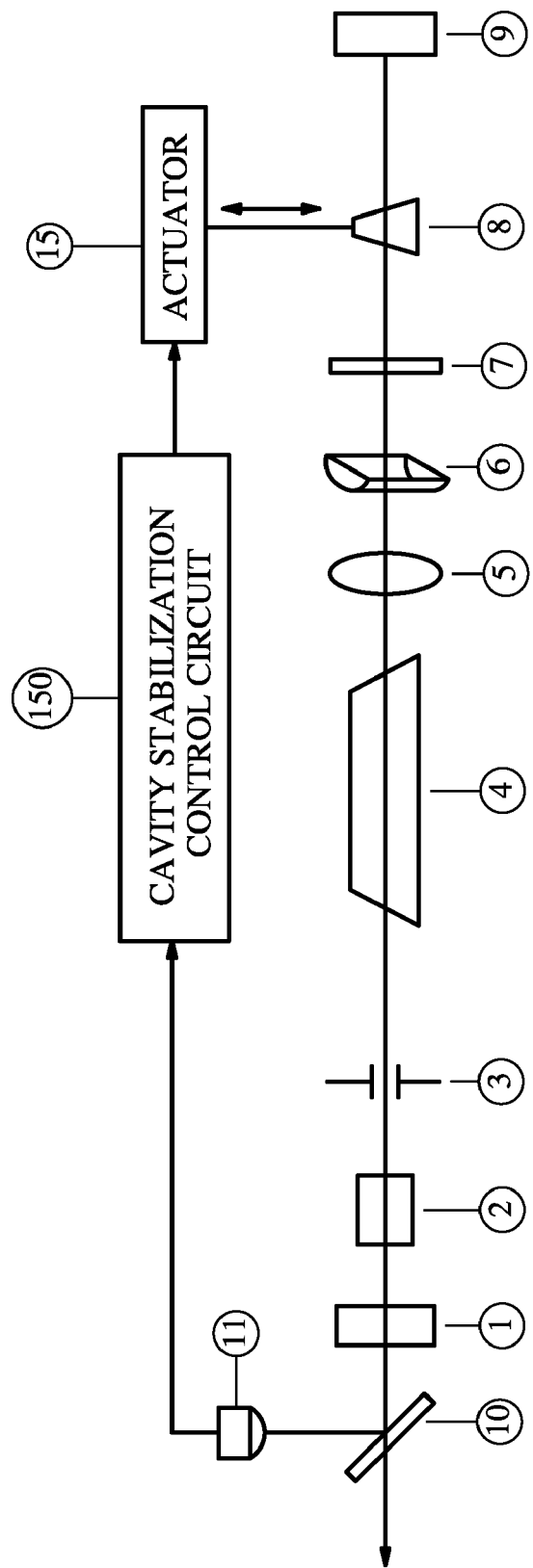
FIG. 1 shows an exemplary embodiment of a mode-locked laser in accordance with the present invention.

FIG. 1 shows an exemplary embodiment of a mode-locked laser 100 in accordance with the present invention. The laser 100 includes a stabilization circuit 150 which will be described in greater detail below.

The laser 100 includes an output coupler mirror 1, a mode locker 2, a transverse mode limit aperture 3, a Nd:YLF crystal 4, a spherical lens 5, a cylindrical lens 6, an etalon 7, a variable thickness polarizer 8, a highly reflective cavity mirror 9, and a beam sampling mirror 10. These elements are arranged along the beam path of the laser cavity.

A sensor 11 monitors the laser beam generated by the laser 100 via a beam sampling mirror 10. The sensor 11 is coupled to the stabilization circuit 150.

The stabilization circuit 150 controls an actuator 15 which moves the variable thickness polarizer 8 in a direction transverse to the beam path. The polarizer 8, which has an index of refraction different from air, has a tapered cross-section so that a transverse movement of the polarizer 8 will change the optical length of the cavity. The polarizer 8 may be comprised of BK7 glass or any other suitable material. The actuator 15 may include a stepper motor, a solenoid, a servo motor, or the like.

Figure 2A:
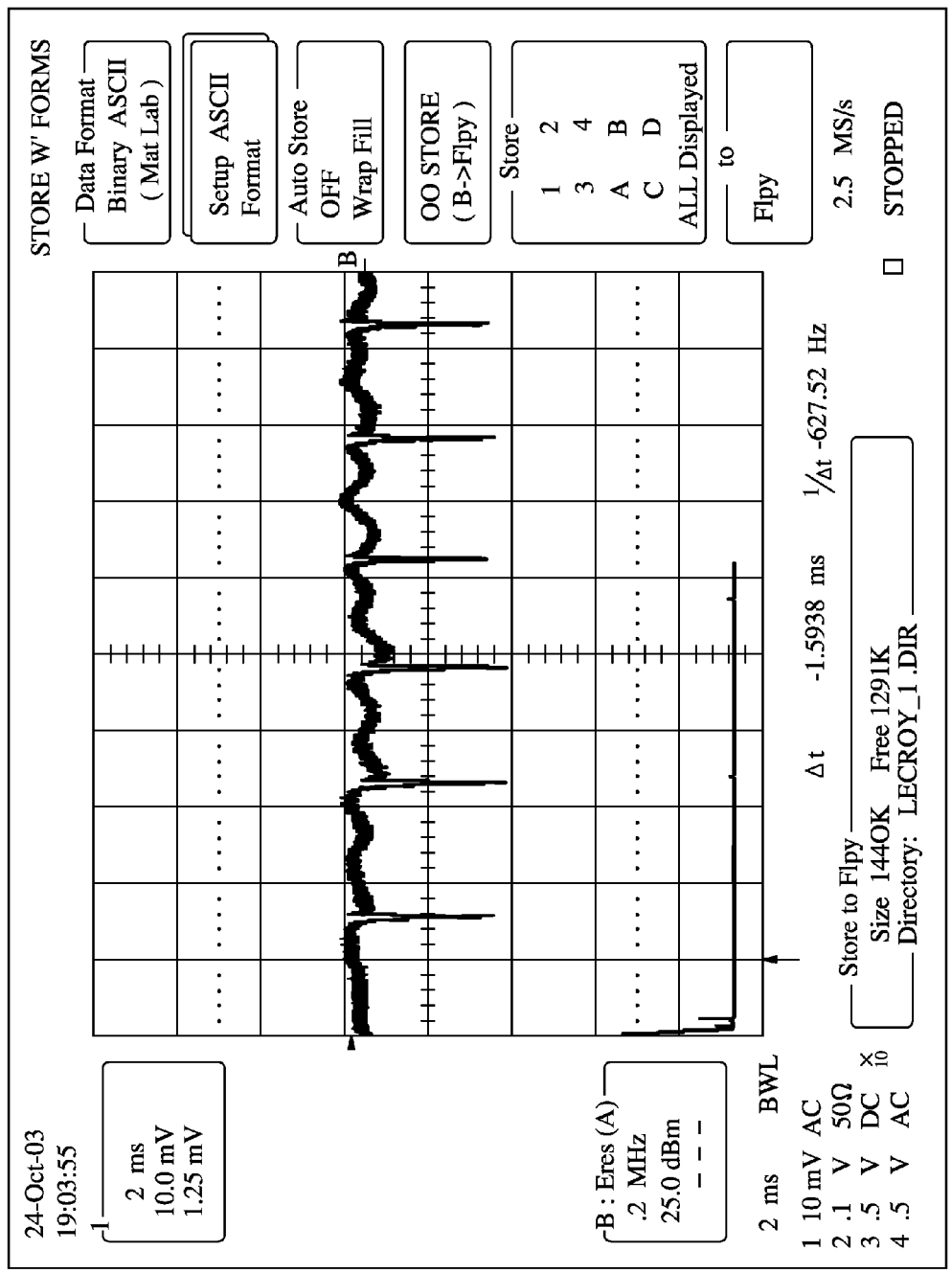
FIG. 2A shows an output waveform of an exemplary laser when the optical length of the laser cavity is shorter than an optimal length.
Figure 2B:
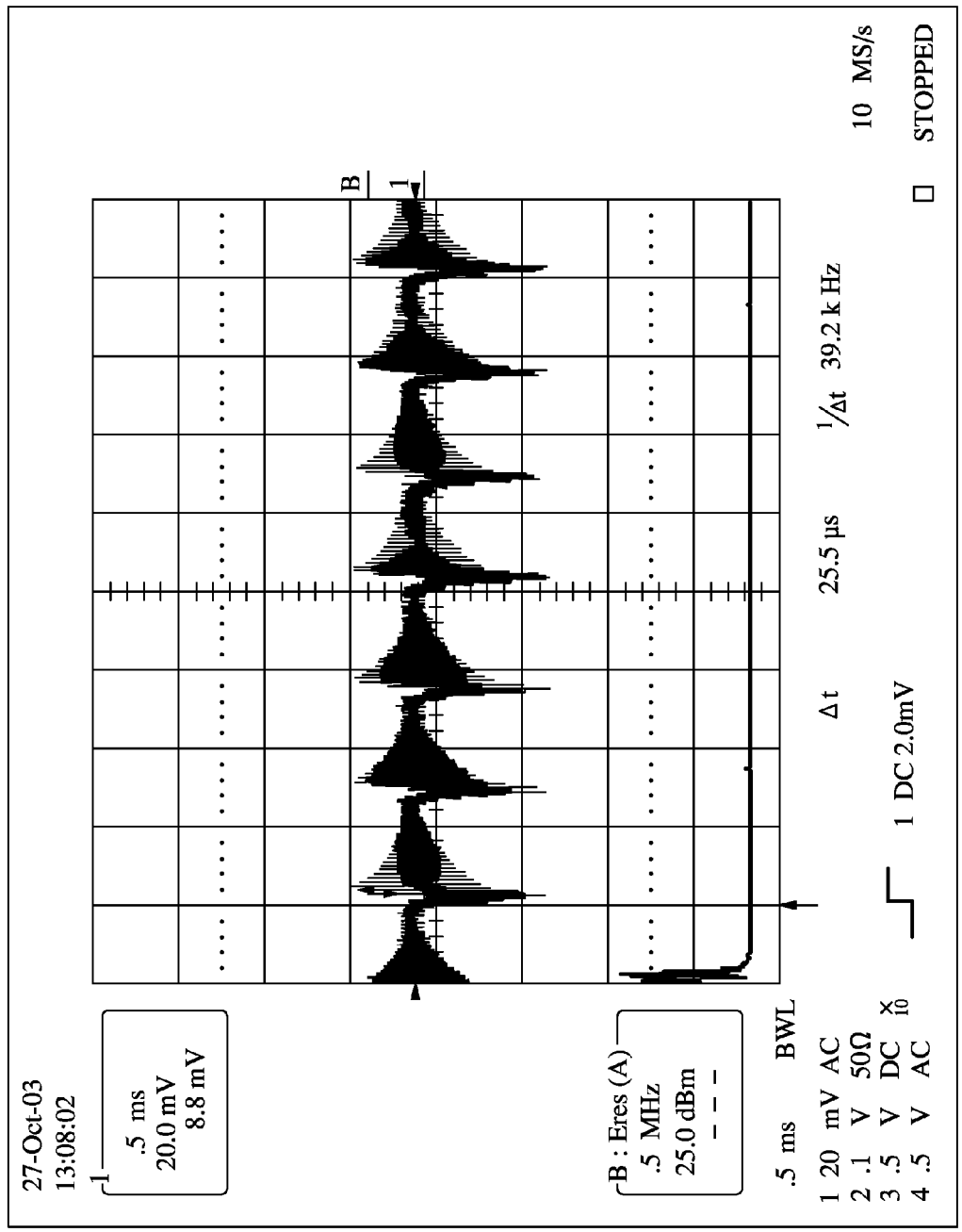
FIG. 2B shows the output waveform of the exemplary laser when the optical length of the laser cavity is longer than the optimal length.

As discussed above, in order for the laser to be in a mode-locked condition, the optical length of the laser cavity must be matched to the pulse repetition frequency (i.e., the frequency of the loss modulator or mode locker) of the laser in accordance with Eq. 1. If these parameters are not properly matched, a significant level of noise appears on the laser beam pulse train. FIG. 2A shows the noise that appears when the optical length is shorter than the optimal length (as determined by Eq. 1), whereas FIG. 2B shows the noise that appears when the optical length is longer than the optimal length. The first noise condition, shown in FIG. 2A, is characterized by a relatively small noise amplitude that is substantially constant. The second noise condition, shown in FIG. 2B, is characterized by a substantially larger noise amplitude that decays over the duration of a pulse.

The mode-locked laser is sensitive to cavity length changes as small as several micrometers. If the cavity length is slightly shorter than the optimal length, the amplitude of the mode-locked pulses decreases and the energy remaining in the laser rod increases. In crystal laser rods such as those comprising YAG or YLF, the refractive index is dependent on the temperature. Consequently, the thermal effect in crystal laser rods changes the optical path length. The increased optical path length compensates for the shorter cavity length, which helps the laser to maintain a mode-locked condition. In such case, the amplitude of the laser pulses will decrease and then return to normal. The profiles of the pulses behave as shown in FIG. 2A.

If the cavity length is slightly longer than the optimal length, the amplitude of the mode-locked pulses decreases and the energy remaining in the laser rod increases. The increased optical path due to the thermal effect worsens the mode locking condition further. The laser exhibits a strong relaxation oscillation because of the unsatisfied mode-lock condition and the pulse profile behaves as shown in FIG. 2B.

In the scenario described above in connection with FIG. 2A, if the cavity length is further shortened so that mode-locking conditions cannot be attained with the thermal effect of the laser rod alone, the pulse profile appears like that of FIG. 2B.

Figure 2C:
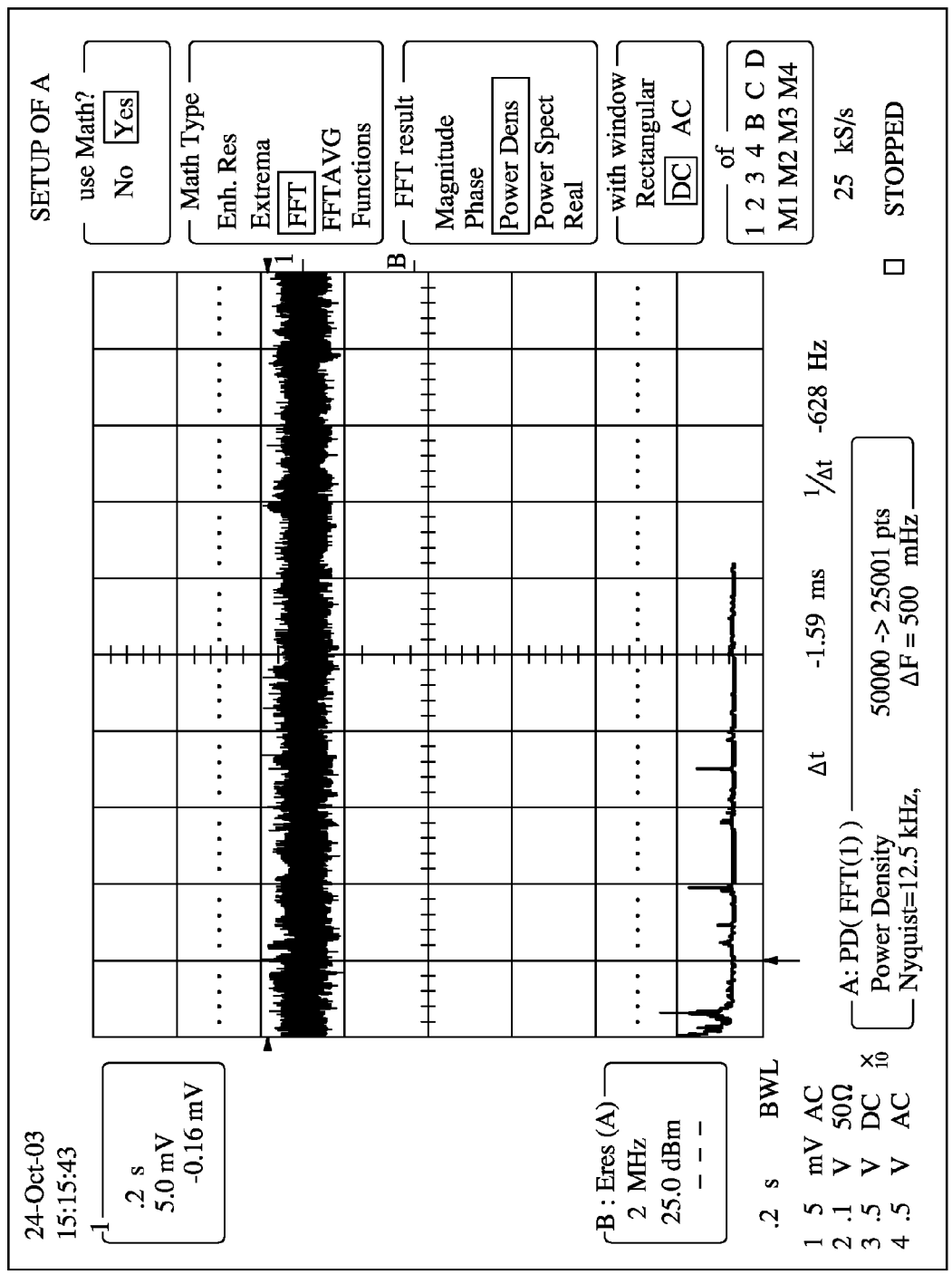
FIG. 2C illustrates the mode-locked condition.

When the optical length is properly matched with the pulse repetition frequency and the laser is thus in a mode-locked state, the noise shown in FIGS. 2A and 2B is not present. The detector signal in a mode-locked condition appears like the trace shown in FIG. 2C. The unipolar spikes of FIG. 2A and the bipolar, ringing spikes of FIG. 2B are not present in FIG. 2C. The condition shown in FIG. 2C is characterized by noise of a relatively constant, lower amplitude.

The stabilization circuit 150 detects the presence of noise and the type of noise on the laser beam and adjusts the optical length of the laser cavity to eliminate the noise and to maintain or bring the laser in a mode-locked state.

Figure 3A:
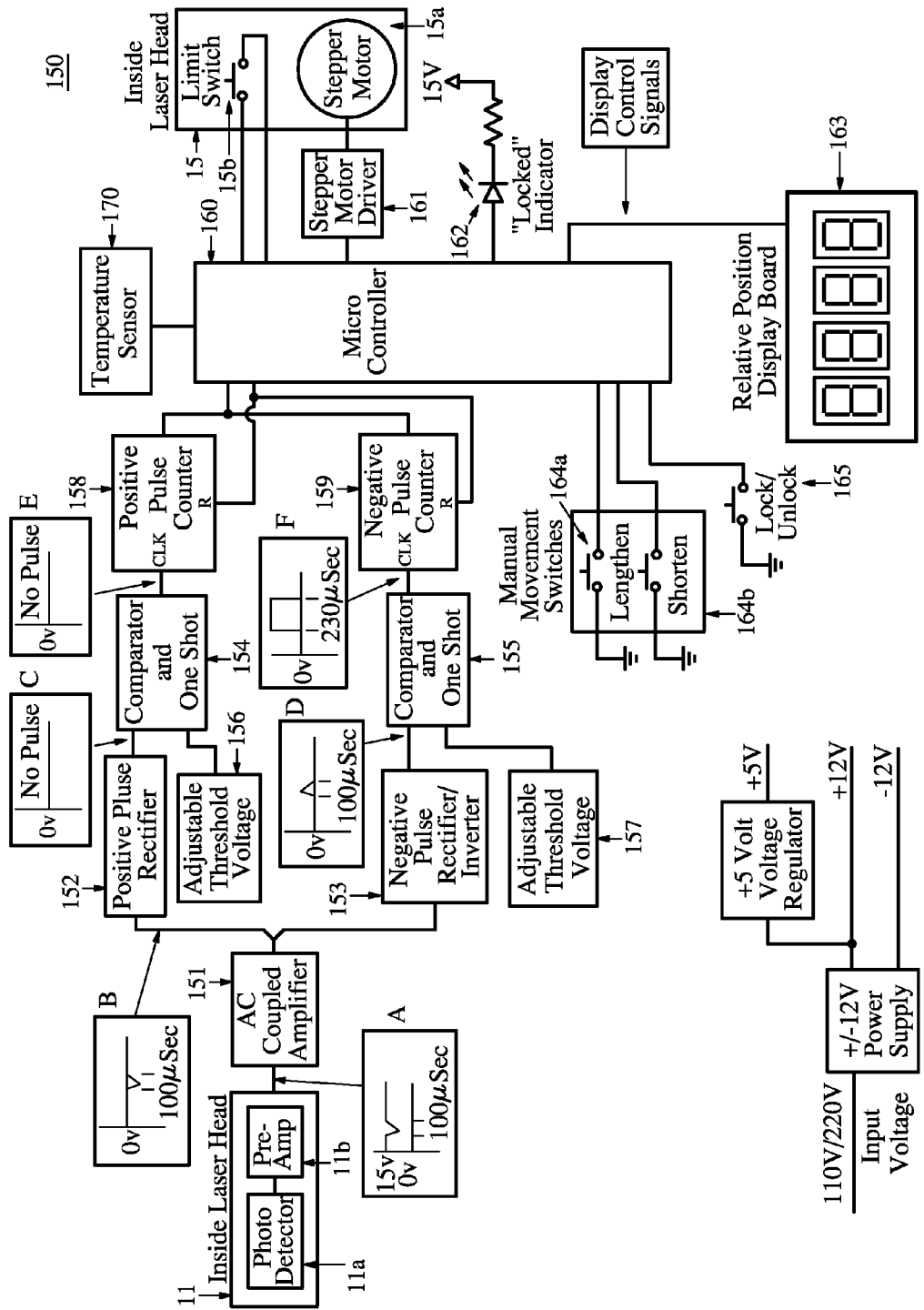
FIGS. 3A and 3B show an exemplary embodiment of a cavity stabilization circuit in accordance with the present invention. Superimposed on FIG. 3A are waveforms that are expected at various nodes of the circuit when the optical length of the laser is less than the optimal length for mode-lock. Superimposed on FIG. 3B are waveforms that are expected at various nodes of the circuit when the optical length of the laser is greater than the optimal length for mode-lock.
Figure 3B:
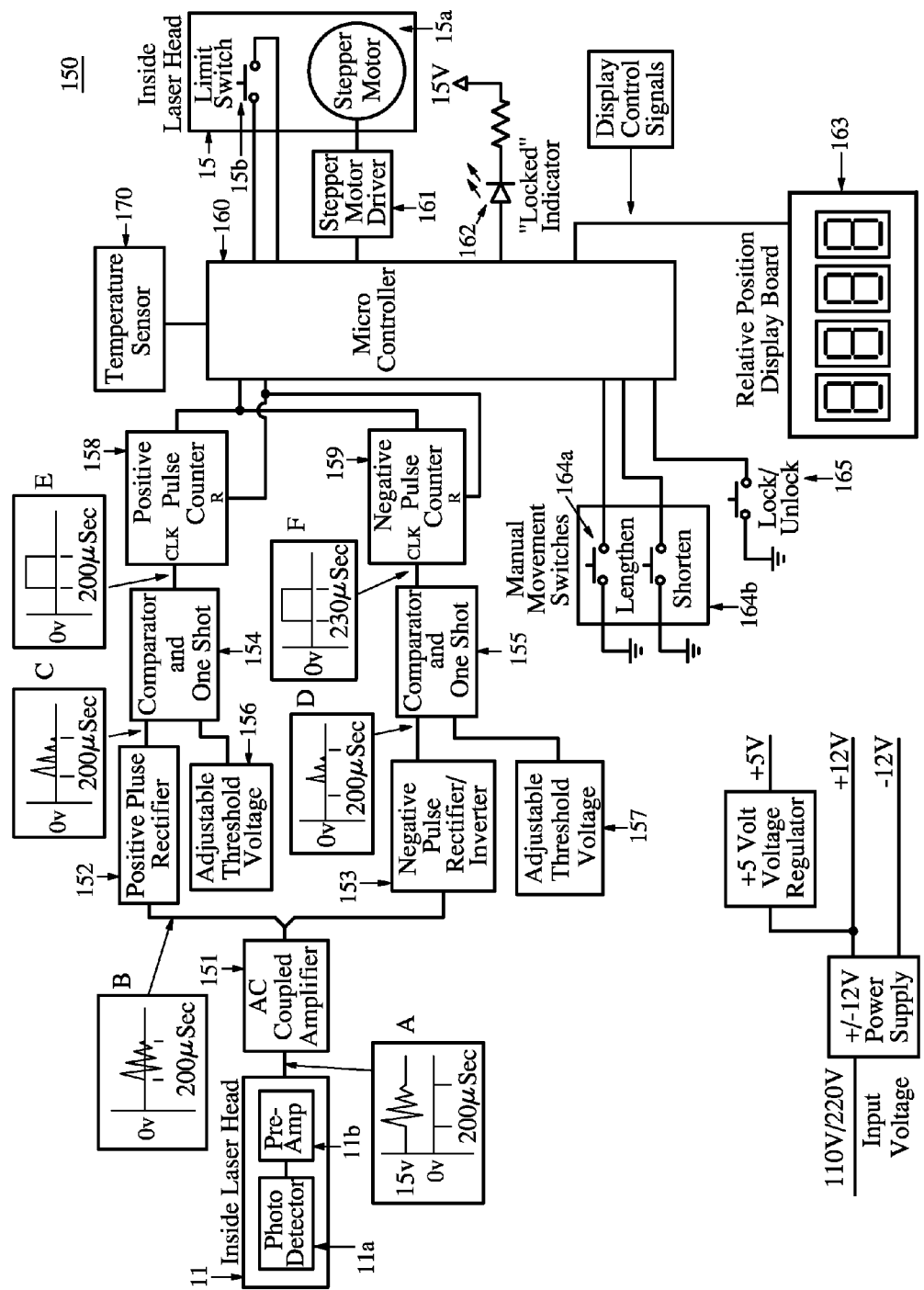

FIGS. 3A and 3B show an exemplary embodiment of a cavity stabilization circuit 150 in accordance with the present invention. Superimposed on FIG. 3A are signal waveforms that are expected at various nodes of the circuit 150 when the optical length of the laser is less than the optimal length for mode-lock (i.e., the "cavity too short" condition). Superimposed on FIG. 3B are signal waveforms that are expected at various nodes of the circuit 150 when the optical length of the laser is greater than the optimal length for mode-lock (i.e., the "cavity too long" condition).

The stabilization circuit 150 is coupled to the sensor unit 11, which includes a photo-detector 11a and a pre-amplifier 11b. The slow sensor responds to a frequency much lower than the 80 MHz mode-locked laser pulse. In this way, the 80 MHz pulsed laser acts same as CW beam. Only the low frequency noise pulse will be captured by the sensor. The output of the pre-amplifier 11b is coupled to an AC coupled amplifier 151. Waveform trace A shows a typical signal output of the sensor unit 11 for the "cavity too short" condition (FIG. 3A) and the "cavity too long" condition (FIG. 3B). Waveform trace B shows the signal output of the AC coupled amplifier 151 for the corresponding waveform trace A. The output of the AC coupled amplifier 151 is coupled to a positive pulse rectifier 152 and a negative pulse rectifier/inverter 153. The outputs of these blocks are shown at C and D, respectively.

The block 152 rectifies the signal at its input (at B) so as to provide only positive excursions of the input signal at its output. In the "cavity too short" case of FIG. 3A, there is no signal output (at C) because the input signal has only negative-going pulses. Conversely, the block 153 rectifies the signal at its input (at B) to provide only the negative excursions at the input and then inverts those, as shown by waveform trace D. In the "cavity too long" case of FIG. 3B, both blocks 152 and 153 have signals at their outputs (C, D, respectively) because the noise detected on the laser beam has both positive and negative excursions.

The outputs of the blocks 152, 153 are coupled to blocks 154, 155, respectively, each of which is a comparator and one-shot. Each of the blocks 154, 155 generates a pulse of fixed duration (e.g., 230 μs) if the voltage of the input signal (at C, D, respectively) exceeds a threshold value set by a threshold voltage block 156, 157, respectively. The threshold voltages can be adjusted between 0 and 5 volts, for example.

The outputs of the blocks 154, 155 are coupled to the clock inputs of counters 158, 159, respectively, so that each time a pulse is generated by the block 154, the counter 158 is incremented and each time a pulse is generated by the block 155, the counter 159 is incremented.

While in the "cavity too short" condition (FIG. 3A), the counter 159 is incremented periodically as negative-going noise is detected on the laser beam. The counter 158, however, is not incremented. While in the "cavity too long" condition (FIG. 3B), both counters 158 and 159 are incremented as the noise has both negative and positive excursions.

In the exemplary embodiment shown, the counters 158, 159 are 8-bit counters and their outputs are coupled to a microcontroller 160 which periodically monitors their contents.

The microcontroller 160 is coupled to a stepper motor driver 161 which drives a stepper motor 15a. The stepper motor 15*a* acts as the aforementioned actuator for moving the variable width polarizer 8 under the control of the microcontroller 160.

A limit switch 15*b* is activated by the stepper motor 15*a* when the stepper motor 15*a* is at a limit of its range of motion. The limit switch 15*b* is coupled to the microcontroller 160 so that the microcontroller can monitor its state. When the circuit 150 is first powered up, reset or whenever the actual position of the stepper motor 15*a* is to be ascertained, the microcontroller 160 drives the stepper motor until it activates the limit switch 15*a*. At that point, the microcontroller "knows" the position of the stepper motor 15*a* (and thus of the polarizer 8) and can proceed accordingly.

The stepper motor 15*a* can preferably rotate clockwise and counter-clockwise, with the direction of rotation under the control of the microcontroller 160.

In operation, the microcontroller 160 is programmed to periodically monitor the counters 158 and 159 and to control the stepper motor 15*a* accordingly (via the driver circuit 161). In an exemplary embodiment, the counters are reset periodically by the microcontroller 160. The microcontroller 160 then waits a predetermined period of time (e.g., 1 sec) and then reads the contents of the counters 158 and 159. If both counters are at or below a predetermined value (e.g., zero), then the microcontroller 160 determines that there is no significant noise on the laser beam and that the optical length of the cavity does not need adjustment; i.e., the laser is in a mode-locked condition.

If the contents of the counter 159 are above a predetermined value, and the contents of the counter 158 are below a predetermined value or the contents of the counter 159 exceed that of the counter 158 by a predetermined value, then a determination is made that the laser is in a "cavity too short" condition (FIG. 3A). In response, the microcontroller 160 controls the stepper motor 15*a* so as to increase the optical length of the cavity (i.e., raise the variable width prism 8 in the embodiment of FIG. 1). The process of resetting and reading the contents of the counters and of activating the stepper motor is repeated until the microcontroller 160 determines that the optical length of the cavity no longer requires adjustment, as described above.

If the contents of the counters 158 and 159 are both above a predetermined value, then a determination is made that the laser is in a "cavity too long" condition (FIG. 3B). In response, the microcontroller 160 controls the stepper motor 15*a* so as to decrease the optical length of the cavity (i.e., lower the variable width prism 8 in the embodiment of FIG. 1). The process of resetting and reading the contents of the counters and of activating the stepper motor is repeated until the microcontroller 160 determines that the optical length of the cavity no longer requires adjustment, as described above.

The actual predetermined threshold values for the counters 158 and 159 are system dependent and are preferably readily changeable in the software or firmware executed by the microcontroller 160. For example, circuit noise may cause one or more of the counters to trigger. Such effects can be compensated for in the threshold values selected.

In the exemplary embodiment shown in FIGS. 3A and 3B, a pair of switches 164*a* and 164*b* are coupled to the microcontroller 160 allowing a user to over-ride the aforementioned automatic process and to indicate to the microcontroller 160 to activate the stepper motor 15*a* to lengthen or shorten the optical length of the laser cavity. A further switch 165 is also coupled to the microcontroller 160 to allow a user to indicate to the microcontroller 160 whether or not to resume the mode-locking process describe above. An indicator 162, such as a light emitting diode, is coupled to the microcontroller 160 and is activated by the microcontroller when a mode-locked condition has been achieved. A display 163 may also be coupled to the microcontroller 160 and can be driven by the microcontroller to provide an indication of the current position of the stepper motor 15*a*, the position of the variable width prism 8, and/or the optical length of the laser cavity.

In a further aspect of the present invention, a temperature sensor 170 can be coupled to the microcontroller 160 to provide an indication of the ambient temperature of the laser cavity. As mentioned above, the optical length of the cavity is largely dependent on the ambient temperature. As such, given an indication of the ambient temperature of the laser cavity, the microcontroller 160 can estimate an appropriate position for the stepper motor 15*a* in order to yield the cavity optical length that that will provide mode lock at that temperature. Such an estimation can be carried out using an algorithm, a look-up table or other suitable arrangement.

The estimate can be used to provide an initial position for the stepper motor 15*a*, after which the aforementioned iterative process can be carried out to provide more precise positioning. This estimation process allows the stabilization circuit 150 to more quickly determine the optimal position for the variable width prism 8 and thus achieve mode lock more quickly.

The estimation process can be improved by noting the current temperature and updating the estimation arrangement (e.g., algorithm, look-up table) with the more precise positioning information obtained by actually carrying out the above-described noise monitoring iterative process. The updated information can be stored preferably in non-volatile memory for use in future estimations. By thus periodically improving the estimation process with actual positioning data, long-term changes in the cavity optical length are also compensated for.

Several variations of the above described embodiment are possible within the scope of the present invention. For example, instead of controlling the transverse position of a variable width element 8 to vary the cavity optical length, the positions or characteristics of other components in the laser cavity can be controlled, such as the position of the mirror 9. Moreover, instead of using a stepper motor 15*a*, the actuator 15 may include a piezeoelectric element to translate an applied electrical signal into the movement of an optical element (e.g., polarizer, mirror). Other methods that can effectively change the cavity optical length can be used, including changing the index of refraction of all or portions of the cavity beam pathway. As discussed above, the refractive index of certain optical elements can be varied by varying their temperatures.

In yet another embodiment, instead of or in addition to controlling the cavity optical length to establish or maintain mode-lock, the loss modulation frequency of the laser can be controlled.

In an exemplary embodiment, the microcontroller 160 can be an 8-bit PIC, such as the 16C73V; the photo detector 11 can be a photodetector FDS100 available from Thor Labs, with simple external circuit; the variable thickness polarizer 8 can be comprised of BK7 glass; the stepper motor has a resolution of 0.01789 degrees/step, such as AM1524-V-12-150, available from Micromo; and the laser can be an Atlas 416 model laser, available from Quantronix.

Instead of a microcontroller 160, other embodiments of the stabilization circuit 150 may be implemented with a computer, a workstation, dedicated logic, or any suitable device for realizing automatic control of the aforementioned process.

The present invention is also applicable to a wide variety of mode-lock lasers including solid state lasers (either lamp-pumped or diode-pumped with gain host materials such as YAG, YLF, $YVO_4$, glass, etc), fiber lasers, gas lasers, and semiconductor lasers.

A variety of arrangements can be used for detecting the laser beam pulse train. As an alternative to detecting the output laser beam, a detector can be used to detect the leakage light from various components in the laser cavity such as the rear cavity mirror. Reflected or scattered light can also be detected.

It is to be understood that while the invention has been described above in conjunction with preferred specific embodiments, the description is intended to illustrate and not to limit the scope of the invention, as defined by the appended claims. Indeed, various modifications of the invention in addition to those described herein will become apparent to those skilled in the art from the foregoing description and the accompanying figures. Such modifications are intended to fall within the scope of the appended claims.

It is further to be understood that all values are to some degree approximate, and are provided for purposes of description.

The disclosures of any patents, patent applications, and publications that may be cited throughout this application are incorporated herein by reference in their entireties.

What is claimed is:

1. A method of stabilizing a mode-locked laser comprising:
    detecting a laser light generated by the mode-locked laser;
    analyzing the detected laser light to determine the presence of at least one of a plurality of noise conditions, wherein a first noise condition indicates that a cavity optical length is too short and a second noise condition indicates that a cavity optical length is too long and wherein the first and second noise conditions have different noise characteristics that are analyzed to determine which noise condition is present; and
    adjusting at least one of a cavity optical length and a loss modulation frequency of the mode-locked laser in accordance with the noise condition present.

2. The method of claim 1, wherein the cavity optical length is adjusted wherein the cavity optical length is increased for the first noise condition and decreased for the second noise condition.

3. The method of claim 2, wherein the first noise condition is characterized by a noise amplitude that is substantially unipolar and the second noise condition is characterized by a bipolar relaxation oscillation noise amplitude.

4. The method of claim 1, wherein the cavity optical length is adjusted by moving an optical component of the mode-locked laser.

5. The method of claim 1, wherein the cavity optical length is adjusted by changing a refraction of an optical component of the mode-locked laser.

6. The method of claim 1, wherein the loss modulation frequency is increased for the first noise condition and decreased for the second noise condition.

7. The method of claim 6, wherein the first noise condition is characterized by a noise amplitude that is substantially unipolar and the second noise condition is characterized by a bipolar relaxation oscillation noise amplitude.

8. The method of claim 1, wherein analyzing the detected laser light includes counting a first number of positive noise spikes and a second number of negative noise spikes and comparing the first and second numbers.

9. The method of claim 1, comprising:
    sensing a temperature of the mode-locked laser; and
    determining an initial cavity optical length adjustment based on the temperature sensed.

10. A system for stabilizing a mode-locked laser comprising:
    a detector, wherein the detector is configured and arranged to detect a laser light generated by the mode-locked laser;
    an analyzer, wherein the analyzer is configured and arranged to analyze the detected laser light to determine the presence of at least one of a plurality of noise conditions, wherein a first noise condition indicates that a cavity optical length is too short and a second noise condition indicates that a cavity optical length is too long and wherein the first and second noise conditions have different noise characteristics, wherein the analyzer is configured and arranged to analyze the noise characteristics to determine which noise condition is present; and
    an adjuster, wherein the adjuster is configured and arranged to adjust at least one of a cavity optical length and a loss modulation frequency of the mode-locked laser in accordance with the noise condition present.

11. The system of claim 10, wherein the system is configured and arranged so that the cavity optical length is increased for the first noise condition and decreased for the second noise condition.

12. The system of claim 11, wherein the first noise condition is characterized by a noise amplitude that is substantially unipolar and the second noise condition is characterized by a bipolar relaxation oscillation noise amplitude.

13. The system of claim 10, wherein the adjuster is configured and arranged to adjust the cavity optical length by moving an optical component of the mode-locked laser.

14. The system of claim 10, wherein the adjuster is configured and arranged to adjust the cavity optical length by changing a refraction of an optical component of the mode-locked laser.

15. The system of claim 10, wherein the adjuster is configured and arranged to increase the loss modulation frequency for a first noise condition and is configured and arranged to decrease the loss modulation frequency for a second noise condition.

16. The system of claim 15, wherein the first noise condition is characterized by a noise amplitude that is substantially unipolar and the second noise condition is characterized by a bipolar relaxation oscillation noise amplitude.

17. The system of claim 10, wherein the analyzer includes:
    a first counter, wherein the first counter is configured and arranged to count a first number of positive noise spikes;
    a second counter, wherein the second counter is configured and arranged to count a second number of negative noise spikes; and
    a comparator, wherein the comparator is configured and arranged to compare the first and second numbers.

18. The system of claim 10, comprising:
a temperature sensor, wherein the temperature sensor is configured and arranged to sense a temperature of the mode-locked laser; and
means for determining an initial cavity optical length adjustment based on the temperature sensed.

19. The method of claim 1, wherein the noise characteristics comprise a polarity of the noise.

20. The system of claim 10, wherein the noise characteristics comprise a polarity of the noise.

* * * * *